United States Patent [19]

Kornfein et al.

[11] Patent Number: 5,259,533
[45] Date of Patent: Nov. 9, 1993

[54] FISH, BIRD AND SMALL ANIMAL FEED DISPENSER

[75] Inventors: George Kornfein, Valley Cottage; Stanford Pavenick, New York, both of N.Y.

[73] Assignee: Poseidon Aqua Products Inc., Valley Cottage, N.Y.

[21] Appl. No.: 793,823

[22] Filed: Nov. 18, 1991

[51] Int. Cl.⁵ .............................................. B67D 5/64
[52] U.S. Cl. ...................................... 222/170; 222/171; 222/650; 222/305; 222/456; 119/51.04; 119/51.11
[58] Field of Search ................... 119/51.04, 51.11; 222/169, 170, 171, 290, 308, 305, 355, 454, 456, 650, 434, 444

[56] References Cited

U.S. PATENT DOCUMENTS

| | | | |
|---|---|---|---|
| 2,042,455 | 6/1936 | Barrott | 222/433 X |
| 2,700,489 | 1/1955 | Sheft | 119/51.04 X |
| 2,847,066 | 8/1958 | Kleiber et al. | 119/51.11 X |
| 2,869,638 | 1/1959 | Sullivan | 119/51.11 X |
| 2,956,711 | 10/1960 | Mortara et al. | 222/170 |
| 2,978,148 | 4/1961 | Schwartz | 119/51.04 X |
| 3,031,109 | 4/1962 | Krag | 119/51.04 X |
| 3,043,479 | 7/1962 | Gaukstern | 119/51.04 X |
| 3,091,371 | 5/1963 | Marx et al. | 222/170 |
| 3,140,693 | 7/1964 | Kaunzner | 119/51.11 X |
| 3,156,214 | 11/1964 | Denney et al. | 119/51.04 |
| 3,426,688 | 2/1969 | Jones | 222/170 X |
| 3,528,588 | 9/1970 | Moore | 119/51.04 X |
| 3,578,209 | 5/1971 | Fraser | 222/650 X |
| 3,605,697 | 9/1971 | Szekely | 119/51.11 |
| 3,645,422 | 2/1972 | Cretors | 222/169 |
| 3,894,660 | 7/1975 | Snyder | 222/170 |
| 4,027,627 | 6/1977 | Fillion | 119/51.11 |
| 4,256,058 | 3/1981 | Deakins | 119/51.11 |
| 4,492,182 | 1/1985 | Wensman et al. | 119/51.04 |
| 4,981,106 | 1/1991 | Nagatoma | 222/650 X |
| 5,003,925 | 4/1991 | Roberts | 222/170 X |
| 5,037,018 | 8/1991 | Matsuda et al. | 222/650 |
| 5,072,695 | 12/1991 | Newton et al. | 119/51.04 |
| 5,094,187 | 3/1992 | King | 119/51.5 |
| 5,119,764 | 6/1992 | Tum | 119/51.04 |
| 5,119,765 | 6/1992 | Roush, Jr. | 119/57.91 |

FOREIGN PATENT DOCUMENTS

| | | |
|---|---|---|
| 977225 | 11/1975 | Canada . |
| 2420087 | 10/1975 | Fed. Rep. of Germany . |
| 1375955 | 12/1963 | France . |
| 2151442 | 7/1985 | United Kingdom . |
| 2228103 | 8/1990 | United Kingdom . |
| 2231613 | 11/1990 | United Kingdom ............. 119/51.04 |

Primary Examiner—Andres Kashnikow
Assistant Examiner—Kenneth DeRosa
Attorney, Agent, or Firm—Dilworth & Barrese

[57] ABSTRACT

A dispenser for smoothly and reliably dispensing flowable or particulate matter such as fish food is provided, in which dynamic gravity of the matter itself is utilized to regulate dispensing of the same in an uncomplicated manner. The dispenser has a container adapted to be mounted upon a rotatable shaft and having a hollow interior with two openings therethrough for communicating with external surroundings. A partition is mounted within the container interior for dividing a portion of the container interior into a plurality of compartments. The partition extends between the openings to limit quantity of matter falling into one of the compartments as the container rotates. A duct is mounted to rotate with the container and communicates with one of these openings. As the container rotates, the partition regulates the quantity of matter falling into the dispensing compartment and directs matter not discharged from the dispensing compartment back into the other compartment.

23 Claims, 2 Drawing Sheets

FISH, BIRD AND SMALL ANIMAL FEED DISPENSER

BACKGROUND OF THE INVENTION

The present invention is directed to a dispenser for dispensing flowable or particulate matter such as fish food, birdseed, etc. More particularly, the present invention is directed to a timed dispenser for dispensing matter during a set cycle or over predetermined intervals.

Dispensers for meting out set quantities of matter such as fish or animal food have been known for quite some time. For example, U.S. Pat. No. 5,003,925 to Roberts relates to a fish food dispenser in the shape of a rotatable cylinder and having a scoop and chute mounted within an interior thereof. As the scoop rotates through the lowest position of the dispenser, it is filled with material that falls into the chute as the scoop rotates through the top position of the dispenser, with some material falling back into the interior of the cylinder itself.

U.S. Pat. No. 5,037,018 to Matsuda et al. concerns an automatic fish feeder which comprises a container having a discharge port and a partition wall extending inwardly from an upper edge of this discharge port. An adjusting member situated along the discharge path controls the amount of feed that is dispensed. U.S. Pat. No. 3,156,214 to Denney et al. discloses an automatic fish feeder in which a cylindrical feed container is keyed onto a motor shaft of a conventional electric clock. A deflector baffle is secured within the container for tumbling fish food as the container rotates, the food exiting through an intake opening provided on the lid of the container. U.S. Pat. No. 2,042,455 is directed to a volumetric dispenser for liquids in which a partition is positioned within a vessel to define a measuring compartment for liquid therewithin. U.K. Patent application No. 2,228,103 relates to a cylindrical cartridge for dispensing toner in a photocopying machine in which a bent baffle is positioned.

However, dispensers for dispensing flowable or particulate matter such as fish food have all previously suffered from several disadvantages. Smooth, continuous dispensing of flowable or particulate matter has at best been difficult, with such dispensers being primarily suited for dispensing flowable or particulate matter at set, finite instants. Furthermore, ambient vapors, e.g. moisture from a fish tank, can easily enter such feeding apparatus such as through the feed outlet and dampen and coagulate the food contents therewith which makes it impossible to dispense the food from the feeding apparatus. Dispensing of particulate matter in general from such devices is rather difficult, because the exit conduits can easily become clogged with particulate matter. Uncomplicated dispensing of discrete adjustable quantities has been a problem in the past, because regulating of amounts of material dispensed at each interval has necessitated rather involved steps and/or components in such devices.

SUMMARY OF THE INVENTION

Accordingly, it is an object of the present invention to improve dispensing of particulate or flowable matter.

It is also an object of the present invention to improve regulation of the amount of flowable or particulate matter being dispensed.

It is an additional object of the present invention to uncomplicate dispensing of flowable or particulate matter in continuous fashion.

It is an additional object of the present invention to protect flowable or particulate matter before and while such matter is being dispensed.

These and other objects are provided by the present invention which is directed to a dispenser for flowable or particulate matter, the dispenser comprising:

a container adapted to be mounted upon a rotatable shaft;

the container comprising a hollow interior and two openings therethrough for communicating the hollow interior with external surroundings, a partition mounted within the container interior for dividing a portion of the container interior into a plurality of compartments, the partition extending between the openings to limit quantity of matter falling into one of the compartments as the container rotates, and a duct mounted upon the container to rotate therewith, the duct communicating with one of the openings.

The dispenser of the present invention provides for smooth, reliable dispensing of flowable or particulate matter over a set cycle in an uncomplicated manner. The contents of the dispenser, e.g., fish feed, are also shielded from ambient surroundings, e.g., from moisture attack due to vapors arising from a fish tank, while stored in the container or in the process of being dispensed from the duct therefrom.

BRIEF DESCRIPTION OF THE DRAWINGS

The present invention will be explained in greater detail below with reference to the accompanying drawings in which.

DESCRIPTION OF THE PREFERRED EMBODIMENTS

While the illustrated embodiment of the present invention will be described with respect to dispensing fish food which is generally in the form of flakes, the apparatus of the present invention can be used to dispense any particulate or flowable matter such as birdseed, other types of animal feed or even liquids. Particulate matter which can be dispensed according to the present invention may be in flake, granular or pellet form.

Figure 1:
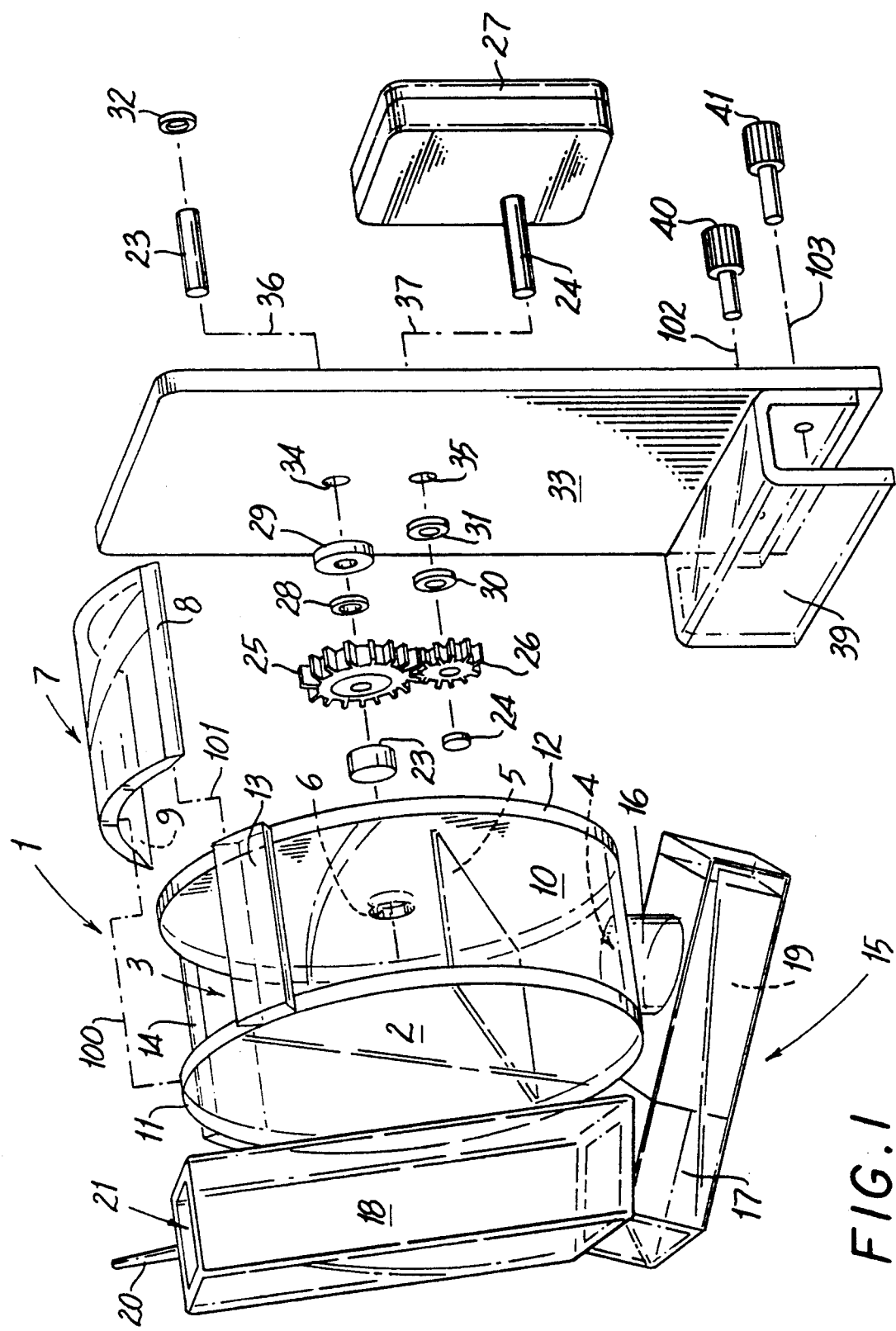
FIG. 1 is an exploded view of the apparatus according to the present invention.

Referring to FIG. 1, the dispenser 1 of the present invention is depicted in exploded form to enhance clarity of illustration. The dispenser 1 comprises a substantially cylindrical drum 2 forming a casing or container for the particulate or flowable matter, this drum 2 having two oppositely-situated openings 3 and 4. The drum 2 is composed of a cylindrical wall 10 and two end plates 11 and 12. A partition 5 is mounted within the drum 2 upon an inner surface wall, and extends most of the way across the interior of the drum 2 as best seen in FIGS. 2-5. In other words, the partition 5 is mounted in chord-like fashion but does not extend completely across the interior of the drum 2, just most of the way thereacross, i.e., between openings 3 and 4. An opening 6 is also provided within the end plate 12 substantially at the center thereof for receiving the shaft of a motor, e.g., a clock shaft.

Opening 3 is closed by a slidable covering 7 having two tapered edges 8 and 9 or any other hatch-like structure for mating with complementary recesses that are provided by flanges 13 and 14 situated upon tubular wall 10. Covering 7 is easily slid into position closing opening 3 in the direction of dash-dot lines 100 and 101 in FIG. 1. This slidable covering 7 is easily removed so that additional feed can be introduced into the drum 2 while at the same time this covering 7 securely closes the opening 3 while the drum 2 is rotating to protect the contents therewithin from ambient conditions.

A duct 15 is mounted upon the drum 2 to communicate with the opposite opening 4. More specifically, this duct 15 is arranged in three angled segments 16, 17 and 18. Segment 16 which is substantially cylindrical in FIG. 1 is directly mounted upon the drum 2 to communicate with opening 4, while segment 17 which comprises an interior channel of substantially rectangular cross-section is coupled to segment 6 so that the interior channels of segments 16 and 17 communicate with one another. An alternate structure for duct 15 can be a curved tube having similar overall configuration.

A third segment 18 is coupled to the second segment 17 so that the interior channel of both these segments communicate, the third segment 18 also comprising an interior channel of substantially rectangular cross-section. While three segments 16, 17 and 18 have been illustrated as constituting the duct 15, it is contemplated that the present invention may be practiced, e.g., with a duct comprising just two segments angled with respect to one another. Alternatively, the duct 15 may be a single, curved tube lapping a portion of the circumference of the drum 2.

Reference numeral 20 denotes a cold finger mounted upon the third segment 18 at the outlet 21 thereof to condense any moisture vapor so that moisture cannot flow up duct 15 to any significant extent. The arrangement of duct 15 prevents moisture vapor from entering interior of drum 2 therethrough. Additionally, a plug 19 comprising a tapered recess can be mounted in the second segment 17 from one end thereof to control the amount of material that is dispensed through opening 4 and ultimately through outlet 21 of the third segment 18.

The segments 16, 17 and 18 that together for the duct 19 are angled with respect to one another to both control dispensing of feed material from the drum 2 and protect the interior of the drum 2 from the ambient surroundings. Also, the openings 3 and 4 are situated upon opposite sides of the partition 5 which extends across the entire axial length of the drum 2. This prevents any feed introduced through opening 3 from immediately falling through opposite opening 4 and allows the partition 5 to regulate discharge of feed through opening 4 as drum 2 rotates. The duct 15 is illustrated as being angled in a direction with respect to both horizontal and vertical planes, and is also arranged so that the outlet 21 extends upwardly when the opening 4 points downwardly as shown in FIG. 1.

The shaft upon which the apparatus is mounted is preferably substantially horizontally disposed. In FIG. 1, reference numeral 23 denotes a driven shaft illustrated in broken segments for purposes of clarity and which is coupled to a drive shaft 24 (also illustrated in broken segments) through gears 25 and 26. Drive shaft 24 is coupled to a motor within housing 27, such as a clock motor, for rotation which is ultimately transferred through gears 25 and 26 and drive shaft 23 to rotate drum 2 which is mounted upon drive shaft 23 at hole 6. The entire unit 1, i.e., drum 2 with duct 15 mounted thereon, is dynamically balanced to minimize necessary force to rotate unit 1. This is accomplished by the manufacturing procedure to ensure that the unit is balanced.

Reference numerals 28, 29, 30, 31 and 32 denote various washers for mounting the shafts 23, 24, dispenser 1, and motor housing 27 upon a mounting bracket 33 through openings 34 and 35 and in the manner indicated by dash-dot lines 36 and 37 as illustrated in FIG. 1. Reference numeral 39 denotes a C-shaped mounting channel for positioning, e.g., upon the edge of a fish tank with pins 40 and 41 or other equivalent securing means (e.g., screws or clamps) being provided for securing the channel 39 and bracket 33 upon the fish tank edge (in the direction of lines 102 and 103 in FIG. 1) and thereby securing the entire apparatus and structure to the fish tank edge.

The apparatus of the present invention operates to smoothly dispense predetermined, adjustable quantities of particulate or flowable matter in a surprisingly uncomplicated manner, by making use of the "dynamic gravity" of the particulate or flowable matter being cycled through the drum 2 and duct 15 upon rotation. The operation of the apparatus of the present invention will now be described with reference to FIGS. 2-5.

Figure 2:
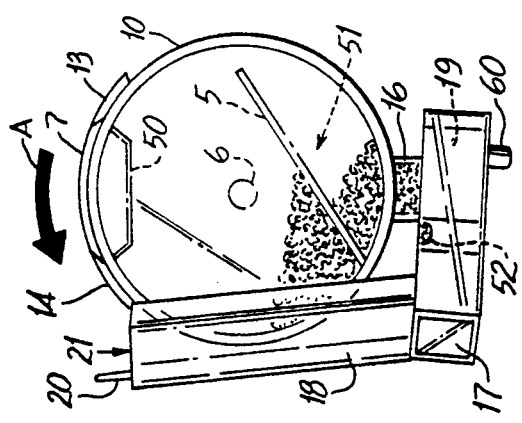

In FIG. 2, the position of dispenser 1 is shown with openings 3 and 4 positioned substantially vertically opposite one another and with outlet 2 of duct 15 facing upwardly. A spout 50 best seen in FIGS. 2, 3 and 5 can also be mounted within the interior of drum 2 around opening 3 to aid introduction of particulate or flowable matter into the drum 2 through opening 3. The apparatus 1 is mounted for counterclockwise rotation in the direction of arrow A in FIG. 2. As seen in FIG. 2, some particulate matter has already entered a discharge compartment 51 defined within the interior of the drum by the partition 5 and cylindrical wall 10, although the bulk of the feed which has been introduced through opening 3 is retained upon partition 5. Some feed from compartment 51 has also entered first segment 16 of conduit 15 and is situated within tapered or slanted recess or notch 52 of plug 19.

As the apparatus 1 rotates in the direction of arrow A in FIG. 1, it reaches a position where the openings 3 and 4 are oriented substantially horizontally opposite one another. In other words, the drum 2 has rotated about 90° or ¼ of a cycle to the position illustrated in FIG. 3. At this point, the feed contained within the recess 52 of the plug 19 has begun to fall or slide down the second segment 17 of the angled duct 15 in the direction of arrow B. The feed remaining in first segment 16 of duct 15 and within discharge compartment 51 of drum 2 is retained therein.

Figure 4:
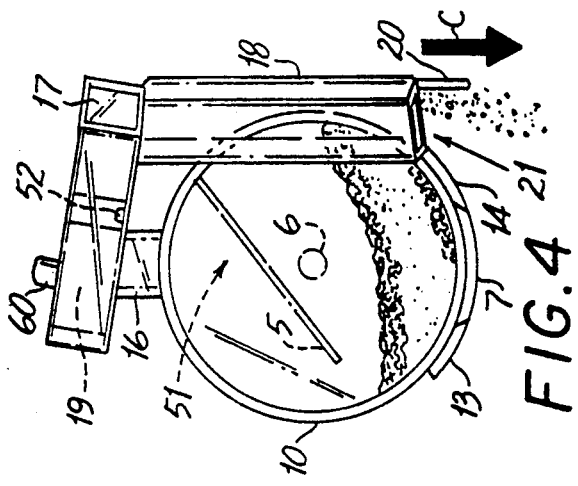
FIGS. 2-5 are schematic views of various positions through a cycle of the apparatus according to the present invention.
Figure 3:
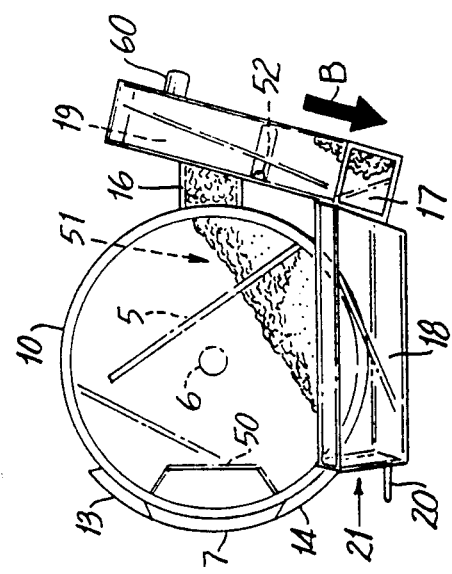

Next, when the apparatus has rotated approximately another 90° or ¼ cycle to the position illustrated in FIG. 4, the position of openings 3 and 4 is substantially inverted to the position shown in FIG. 1. At this point, the feed that moved down duct segment 17 in the direction of arrow B in FIG. 3 is now discharged from outlet 21 in the direction of arrow C in FIG. 4, e.g., into a fish tank. At the same time, the remaining feed that was contained with compartment 51 and duct segment 6 in FIG. 3, has fallen back into the portion of drum 2 interior between first opening 3 partition or baffle 5.

Figure 5:
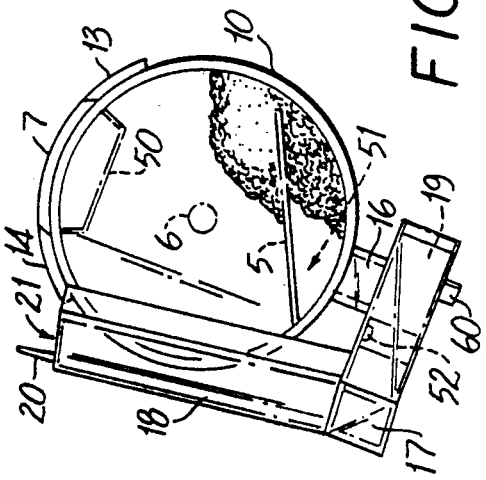

The apparatus continues to rotate, with FIG. 5 illustrating position just before returning to the position of FIG. 1. At this point, feed has begun to slide over the edge of partition 5 and into discharge compartment 51. When the cycle is completed as shown in FIG. 2, the same amount of feed will be situated in compartment 51 and first duct segment 6. Therefore, the dynamic gravity of the cycled feed itself is utilized to control dispensing in a smooth, uncomplicated manner.

Figure 7:
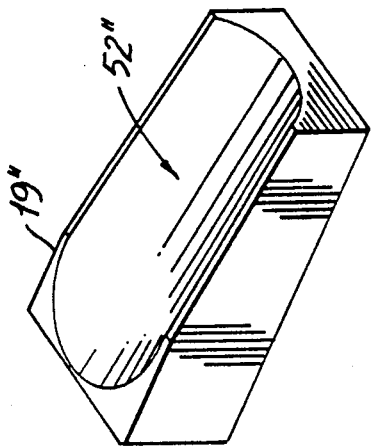
FIGS. 6 and 7 are perspective views of different plugs which can be incorporated into the apparatus according to the present invention.
Figure 6:
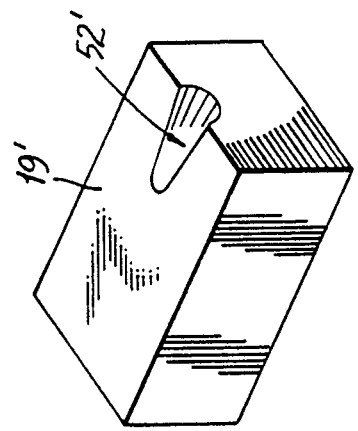

As noted supra, situation of plug 19 with tapered or slanted recess or notch 52 also regulates the amount of feed dispensed upon each complete cycle. The plug 19 is adjustably retained in segment 17 by a set screw 60 situated in a longitudinal open slot (not illustrated) along an edge of segment 17, as best seen in FIGS. 2-5. More particularly, when plug 19 is positioned at a location to administer a desired amount of particulate matter upon each cycle, the screw 60 is tightened to retain the plug at the desired location. FIG. 6 illustrates one plug 19' with a fairly compact tapered or slanted recess or notch 52'' while FIG. 7 illustrates a plug 19'' with a fairly large tapered or slanted recess or notch 52''. Clearly, more feed will be dispensed upon each cycle of apparatus 1 if plug 19'' is used instead of plug 19'. While the cycling of the apparatus can be geared to one complete 24 hour rotation, this is not absolutely critical and the gear ratio can be set to provide any number of cycles over any desired time (e.g., a 12 hour cycle).

As illustrated in the figures, the dispenser 1 is fabricated from transparent plastic. However, the dispenser can be fabricated from any suitable material, e.g., opaque plastic, and assembled together via a pressed fit with appropriate adhesive. The dispenser 1 may also be fabricated in any suitable size as may be required, e.g., to accommodate any amount of particulate or flowable matter for any size fish tank. The angles between adjacent segments 16, 17 and 18 of duct 15 are not critical, so long as the final outlet point 21 from duct 15 is desirably positioned as noted supra.

The preceding description of the present invention is merely exemplary and is not intended to limit the scope thereof in any way.

What is claimed is:

1. A dispenser for flowable or particulate matter, said dispenser comprising
   a container adapted to be mounted upon a rotatable shaft,
   said container comprising a hollow interior and two openings therethrough for communicating said hollow interior with external surroundings,
   a partition mounted with said container interior for dividing a portion of said container interior into a plurality of compartments,
   said partition extending between said openings to limit quantity of matter falling into one of said compartments as said container rotates, and
   means for preventing moisture from the ambient surroundings from entering the interior of said container through one of said openings as said container rotates through an entire dispensing cycle,
   said moisture preventing means comprising a duct mounted to rotate with said container, said duct communicating with said one of said two openings.

2. The dispenser of claim 1 wherein said duct is angled for dispensing the flowable or particulate matter in a series of stages as said duct and container rotate.

3. The dispenser of claim 2 wherein said duct is angled to extend upwardly when said opening communicating with said dust faces downwardly from said container interior.

4. The dispenser of claim 2 wherein said container and duct are oriented such that said duct is angled in a direction with respect to both horizontal and vertical planes in all positions during rotation thereof.

5. The dispenser of claim 1 wherein said two openings are disposed through said container substantially opposite one another.

6. The dispenser of claim 1 wherein said container is substantially in the shape of a cylinder.

7. The dispenser of claim 6 wherein said partition extends along substantially the entire length of the cylinder within said interior of said container.

8. The dispenser of claim 1 additionally comprising:
   a plug adjustable mounted within said duct for controlling the amount of matter disposed upon each complete rotation of said container and duct.

9. The dispenser of claim 8 wherein said adjustable plug comprises a slanted notch formed therein.

10. The dispenser of claim 1, wherein said container and duct are mounted for continuous rotation.

11. The dispenser of claim 10 wherein said container and duct are mounted for rotation in a single direction only.

12. The dispenser of claim 1 wherein the rotatable shaft extends substantially horizontally.

13. The dispenser of claim 12 wherein said partition is mounted to control entry of the matter into one of said compartments communicating with said duct as said opening communicating with said duct begins to swing through a lower position of rotation.

14. The dispenser of claim 1 additionally comprising a spout mounted upon said container to extend into said container interior at said other of said two openings, for enhancing introduction of matter into said container interior.

15. The dispenser of claim 1 additionally comprising a cover arranged for slidably covering and uncovering said other of said two openings.

16. The dispenser of claim 15 wherein said slidable cover comprises tapered edges for mating with complementary-shaped edges of said container at said other opening.

17. The dispenser of claim 1 wherein said duct is mounted upon said container to rotate therewith.

18. The dispenser of claim 1 wherein said container comprises only said two openings and said duct comprises only one outlet at an end thereof opposite an end of said duct communicating with said one of said two openings in said container.

19. A dispenser for flowable or particulate matter, said dispenser comprising
   a container adapted to be mounted upon a rotatable shaft,
   said container comprising a hollow interior and two openings therethrough for communicating said hollow interior with external surroundings,
   a partition mounted within said container interior for dividing a portion of said container interior into a plurality of compartments,
   said partition extending between said openings to limit quantity of matter falling into one of said compartments as said container rotates, and
   a duct mounted to rotate with said container, said duct communicating with one of said openings, wherein said duct is angled for dispensing the flowable or particulate matter in a series of stages as said duct and container rotate, and said duct comprises three sections angled with respect to one another.

20. A dispenser for flowable or particulate matter, said dispenser comprising a container adapted to be mounted upon a rotatable shaft, said container comprising a hollow interior and two openings therethrough for communicating said hollow interior with external surroundings, a partition mounted within said container interior for dividing a portion of said container interior into a plurality of compartments, said partition extending between said openings to limit quantity of matter falling into one of said compartments as said container rotates, and a duct mounted to rotate with said container, said duct communicating with one of said openings, wherein said duct is angled for dispensing the flowable or particulate matter in a series of stages as said duct and container rotate, and said duct is mounted upon said container to dispense substantially all of the matter contained therewithin when said opening communicating with said duct faces upwardly from said container interior.

21. A dispenser for flowable or particulate matter structured and arranged to dispense finite quantities of the matter based upon dynamic gravity, of the matter itself, said dispenser comprising a container mounted for continuous rotation and having a hollow interior and at least one opening for communicating said hollow interior with external surroundings, a partition mounted within said container interior and dividing said interior into a plurality of compartments, one of said compartments being arranged to discharge the matter out of said container, said container and partition being mounted such that as said container and partition continuously rotate through one complete cycle.

(i) said partition regulates quantity of the matter falling into said discharge compartment from said other compartment, and (ii) said partition directs matter not discharged from said discharge compartment upon said cycle back into said other compartment, and means for preventing moisture from the ambient surroundings from entering the interior of said container through one of said openings as said container rotates through an entire dispensing cycle, said moisture preventing means comprising a duct mounted to rotate with said container, said duct communicating with said one of said two openings, whereby said dispenser controls the discharge of the matter from said container based upon the dynamic gravity of the matter as said container continuously rotates.

22. The dispenser of claim 2 wherein said container and partition are mounted to rotate in a single direction only.

23. A dispenser for flowable or particulate matter, said dispenser comprising a container adapted to be mounted upon a rotatable shaft, said container comprising a hollow interior and two openings therethrough for communicating said hollow interior with external surroundings, a partition mounted within said container interior for dividing a portion of said container interior into a plurality of compartments, said partition extending between said openings to limit quantity of matter falling into one of said compartments as said container rotates, and means for preventing moisture vapor from the ambient surroundings from entering the interior of said container through one of said openings as said container rotates, said moisture preventing means comprising a duct mounted to rotate with said container, said duct communicating with said one of said two openings, wherein said duct comprises an outlet to ambient surroundings at an end thereof opposite an end of said duct communicating with said one of said two openings in said container, and said duct and container are mounted such that said one opening faces substantially horizontally or upwardly as matter is being discharged from said duct outlet.

* * * * *